United States Patent [19]

Pielach

[11] Patent Number: 4,763,710
[45] Date of Patent: Aug. 16, 1988

[54] RIM AND SPINDLE FOR TIRE UNIFORMITY MACHINES

[75] Inventor: Martin Pielach, Mt. Clemens, Mich.

[73] Assignee: The Uniroyal Goodrich Tire Company, Akron, Ohio

[21] Appl. No.: 12,913

[22] Filed: Jan. 14, 1987

[51] Int. Cl.4 .............................................. B60C 25/00
[52] U.S. Cl. .......................................... 157/14; 157/21
[58] Field of Search ........................ 157/1, 1.1, 14, 20, 157/21, 13, 16, 18; 73/474, 487; 51/DIG. 33

[56] References Cited

U.S. PATENT DOCUMENTS

| | | | |
|---|---|---|---|
| 2,000,036 | 5/1935 | Renfro | 157/14 |
| 2,081,402 | 5/1937 | Krema | 157/14 |
| 2,116,512 | 5/1938 | Ericson et al. | 157/13 |
| 2,270,657 | 1/1942 | Kraft | 73/53 |
| 2,334,606 | 11/1943 | Castiglia | 157/21 |
| 2,481,926 | 9/1949 | Henderson | 157/14 |
| 2,603,267 | 7/1952 | Simpson | 152/7 |
| 2,752,788 | 7/1956 | La Penta | 73/487 |
| 2,759,508 | 8/1956 | Tobey | 157/20 |
| 2,868,291 | 1/1959 | McMahan | 164/61 |
| 2,918,116 | 12/1959 | Mooney | 157/13 |
| 2,973,791 | 3/1961 | French | 157/14 |
| 3,219,078 | 11/1965 | Wright | 157/18 |
| 3,238,982 | 3/1966 | Darr | 157/14 |
| 3,291,171 | 12/1966 | Lehmann | 157/18 |
| 3,483,757 | 12/1969 | Kushmuk et al. | 73/487 X |
| 3,556,194 | 1/1971 | Farrington | 157/13 |
| 3,583,238 | 6/1971 | Haynes | 157/21 X |
| 3,614,969 | 10/1971 | Breiner | 157/13 |
| 4,118,989 | 10/1978 | Wood | 157/14 X |
| 4,202,213 | 5/1980 | Toriselli | 73/487 |

Primary Examiner—Debra Meislin
Attorney, Agent, or Firm—Alan A. Csontos; John D. Haney; Michael J. Colitz, Jr.

[57] ABSTRACT

A rim assembly and a spindle assembly including locking ramps for releasably coupling them for concurrent rotation. The rim assembly has an exterior peripheral flange, an interior axial opening, a plurality of locking ramps extending radially inwardly into the opening with locking ramps having inclined surfaces on one face thereof. The spindle assembly has a taper body with an exterior face to be received within the opening of the rim assembly, a locking rotor coupled to the taper body, locking ramps extending radially outwardly therefrom with inclined surfaces on one face thereof couplable with the inclined surfaces of the rim assembly upon the rotation of said locking rotor. Locking pins are also included to lock the locking rotor in a first orientation with respect to the taper body when the inclined surfaces of the assemblies are out of contact. Also disclosed are the assemblies, per se.

8 Claims, 8 Drawing Sheets

RIM AND SPINDLE FOR TIRE UNIFORMITY MACHINES

BACKGROUND OF THE INVENTION

1. Field of the Invention

This invention relates to tire rims and spindles and, more particularly, to a rim assembly and a spindle assembly couplable together which may be used in tire uniformity machines or the like.

2. Description of the Prior Art

As manufactured, tires are not always uniform in their distribution of materials throughout their masses. Tires with a lesser degree of uniformity will induce greater vibrational and acoustical disturbances into the vehicles on which they are utilized. Conversely, tires with a greater degree of uniformity will induce lesser or no disturbances into the vehicle on which they are utilized and thus provide a superior ride. Tires manufactured with an unacceptable degree of non-uniformity may be reworked as through buffing or grinding or the like prior to sale and use. In any event, the manufacturer must continuously remain cognizant of the quality of his manufactured tires, always trying to improve them, in order to maintain the quality of his products in the market place and retain a competitive edge.

Manufactured tires are normally tested on machines to determine their uniformity. Efforts are continuously being made to improve tire uniformity machines which may more accurately and conveniently test and grade tires and determine their degree of uniformity or non-uniformity. The most common type of tire uniformity machine in commercial use today requires the manual placement of a tire, supported on a rim, onto a rotatable spindle. An adjacent roadwheel is rotated in contact with the test tire at speeds and loads representative of those which occur on automobiles in service. During testing, vibrations caused by non-uniformities or irregularities in any test tire are induced into the roadwheel. A transducer coupled with the roadwheel may sense and record the vibrations of the roadwheel. Such roadwheel vibrations represent tire nonuniformity since vibrations of the roadwheel correspond with vibrations of the tire.

Uniformity machiens may be rendered more efficient by several techniques. First, the coupling of the transducer to a test spindle rather than to the roadwheel will preclude the enormous inertia of the roadwheel from dempening out much of the vibrations intended to be measured Second, the placement of the test tire with its supporting rim onto the test spindle has been found to be more accurate and less conducive to error when done automatically rather than when such placement is done manually by an operators Third, the use of specially designed precision rims and spindles at the test station can reduce or eliminate extraneous vibrational signals normally caused by conventional rims and spindles. Reducing or eliminating such extraneous vibrational signals results in the transducer sensing only those signals caused by tire non-uniformity for more accurate grading of tires as intended.

In this last regard, the prior art discloses many types of rims and spindles as well as a wide variety of techniques for coupling such rims to spindles for various purposes. A common purpose for such coupling is so that the manufactured tire might be trimmed, buffed, trued or the like for rendering the tire more uniform in its shape. Note, for example, U.S. Pat. Nos. 2,321,936 to Pollock; 2,759,508 to Tobey; 2,868,291 to McMahan; 2,918,116 to Mooney; and 3,556,194 to Farrington. Similarly, such coupling techniques might be utilized for supporting a tire for rotation during a recapping or retreading operation. Note for example, U.S. Pat. Nos. 2,116,512 to Ericson, et al and 3,614,969 to Breiner. The prior art discloses many other additional techniques and devices for supporting a rim on a spindle for various other purposes. Such purposes include tire building, tire changing, tire balancing, tread building, or the like. Note for example, U.S. Pat. Nos. 2,000,036 to Renfro; 3,081,402 to Krema; 2,270,657 to Kraft; 2,334,606 to Castiglia; 2,481,926 to Henderson; 2,603,267 to Simpson; 2,973,791 to French; 3,219,078 to Wright; and 3,238,982 to Darr. Lastly, the prior art also disloses devices for supporting a pneumatic tire on a spindle through a rim wherein the device includes apparatus for automatically inflating the tire. Note, for example, U.S. Pat. Nos. 2,960,130 to Smyser and 3,291,171 to Lehmann.

None of these prior art patents or commercial devices teach or suggest the rim assembly and/or spindle assembly as described herein which may be employed in tire uniformity machines or for any of a wide variety of uses where a tire, supported on a rim, is to be coupled with a spindle. Known rims and spindles are simply lacking in one regard or another.

As illustrated by the great number of prior patents and commercial devices, efforts are continuously being made in an attempt to more readily support tires on rims and to support and couple such rims on spindles. None of these prior art efforts, however, suggests the present inventive combination of component elements arranged and configured as disclosed and claimed herein. Prior apparatus do not provide the benefits attendant with the apparatus of the present invention. The present invention achieves its intended purposes, objectives and advantages over the prior art devices through a new, useful and unobvious combination of component elements, through the use of a minimum number of functioning parts, at a reduction in cost to manufacture and operate, and through the utilization of only readily available materials and conventional components.

These objects and advantages should be construed as merely illustrative of some of the more prominent features and applications of the present invention. Many other beneficial results can be attained by applying the disclosed invention in a different manner or by modifying the invention within the scope of the disclosure. Accordingly, other objects and advantages as well as a fuller understanding of the invention may be had by referring to the summary and detailed description of the preferred embodiment of the invention in addition to the scope of the invention as defined by the claims taken in conjunction with the accompanying drawings.

SUMMARY OF THE INVENTION

The present invention is defined by the appended claims with the specific preferred embodiment shown in the attached drawings. For the purposes of summarizing the invention, the invention may be incorporated into the combination of a rim assembly and a spindle assembly including means for releasably coupling the rim assembly and the spindle assembly for concurrent rotation. In the combination, the rim assembly has an exterior peripheral flange adapted to support a tire thereon. The rim assembly also has an interior axial opening for receiving the spindle assembly to which it is to be coupled. The rim assembly also has a plurality of locking ramps extending radially inwardly into the opening, The locking ramps have inclined surfaces on one face thereof. The spindle assembly has a taper body with an exterior face of a size and shape to be received within the opening of the rim assembly. The spindle assembly also has a locking rotor coupled to the taper body. The locking rotor has locking ramps extending radially outwardly thereform. The locking ramps have inclined surfaces on one face thereof couplable with the inclined surfaces of the rim assembly upon the rotation of the locking rotor. The combination also includes locking means to lock the locking rotor in a first orientation with respect to the taper body when the inclined surfaces of the spindle assembly are out of contact with the inclined surfaces of the rim assembly.

The locking means includs pin means extending through a portion of the taper body and into the locking rotor to preclude rotational motion therebetween. The combination further includes means to retract the pin means from the locking rotor whereby the locking rotor may rotate with respect to the taper body for coupling the rim assembly to the spindle assembly. The combination further includes spring means urging together the inclined surfaces of the rim assembly and the inclined surfaces of the spindle assembly. The means to retract the pin means extends to exterior of the taper body and the locking rotor. The inclined surfaces of the spindle assembly face downwardly and are located above the inclined surfaces of the rim assembly which face upwardly. Spaces are provided between the locking ramps of both the spindle assembly and the locking ramps of the rim assembly for the passage of the locking ramps of the rim assembly to beneath the locking ramps of the spindle assembly. The vertical edges of the locking ramps of the spindle assembly between its locking ramps are adapted to receive forces from an external mechanism to rotate the locking rotor between its locked and unlocked positions. The means to retract the pin means extends above the locking rotor whereby the external mechanism may be located to concurrently retract the pin means and rotate the loocking rotor.

The invention may also be incorporated in a rim assembly for being received on a spindle assembly and including means for releasably coupling the spindle assembly to the rim assembly for concurrent rotation. The rim assembly comprises: (1) an exterior peripheral flange adapted to support a tire thereon; (2) an interior axial opening for receiving the spindle assembly to which the rim assembly is to be coupled; and (3) a plurality of locking ramps extending radially inwardly into the opening, the locking ramps have upwardly facing inclined surfaces.

The rim assembly includes a radially interior taper sleeve and a radially exterior rim and means to releasably couple the taper sleeve and the rim whereby the taper sleeve may be utilized with any one of a plurality of different rims. The radially interior face of the taper sleeve is formed in a frustroconical configurations for being received on a test spindle of a corresponding configurations. The rim assembly further includes air passage means for the introduction of air from exterior of the rim to interior of a test tire supported on the rim. The rim assembly further includes valve means to allow for the introduction of air into the rim and a test tire supported on the rim and for sealing introduced air therein.

In addition, the invention may be incorporated in a spindle assembly for receiving a rim assembly supporting a test tire thereon and including means for releasably coupling the rim assembly at said spindle assembly for concurrent rotation. The spindle assembly comprises: (1) a taper body with a radially exterior face of a size and shape to be received within an opening of the rim assembly; (2) a locking rotor coupled to the taper body, the locking rotor having locking ramps extending radially outwardly therefrom, the locking ramps having inclined surfaces on one face thereof coupleable with inclined surfaces of the rim assembly upon the rotation of the locking rotor; and (3) means to lock the locking rotor in a first orientation with respect to the taper body when the inclined surfaces of the spindle assembly are out of contact with the rim assembly.

The locking means includes pin means extending through a portion of the taper body and into the locking rotor to preclude rotational motion therebetween. The spindle assembly further includes means to retract the pin means from the locking rotor whereby the locking rotor may rotate with respect to the taper body for coupling a rim assembly to the spindle assembly. The spindle assembly further includes spring means urging the inclined surfaces of the spindle assembly into contact with locking ramps of a rim assembly. The locking ramps of the spindle assembly are located above the locking ramps of a rim assembly and spaces are provided between the locking ramps of both the spindle assembly and locking ramps of a rim assembly for the passage of the locking ramps of the rim assembly to beneath the locking ramps of the spindle assembly. The vertical edges of the locking ramps of the spindle assembly between its locking ramps are adapted to receive forces from an external mechanism to rotate the locking rotor between its locked and unlocked positions. The means to retract the pin means extends above the locking rotor whereby the external mechanism may be positioned to retract the pin means and to rotate the locking rotor.

The foregoing has outlined rather broadly the more pertinent and important features of the present invention in order that the detailed description of the invention that follows may be better understood whereby the present contribution to the art may be more fully appreciated. Additional features of the invention will be described hereinafter which form the subject of the claims of the present invention. It should be appreciated by those skilled in the art that the conception and the specific embodiment disclosed herein may be readily utilized as a basis for modifying or designing other apparatus for carrying out the same purposes of the present invention. It should also be realized by those skilled in the art that such equivalent apparatus do not depart from the spirit and scope of the invention as set forth in the appended claims.

BRIEF DESCRIPTION OF THE DRAWINGS

For a more complete understanding of the nature, objects and advantages of the present invention, reference should be had to the followiong detailed description taken in conjunction with the accompanying drawings in which.

Similar reference numerals refer to similar parts throughout the several Figures.

DETAILED DESCRIPTION OF THE INVENTION

Figure 1:
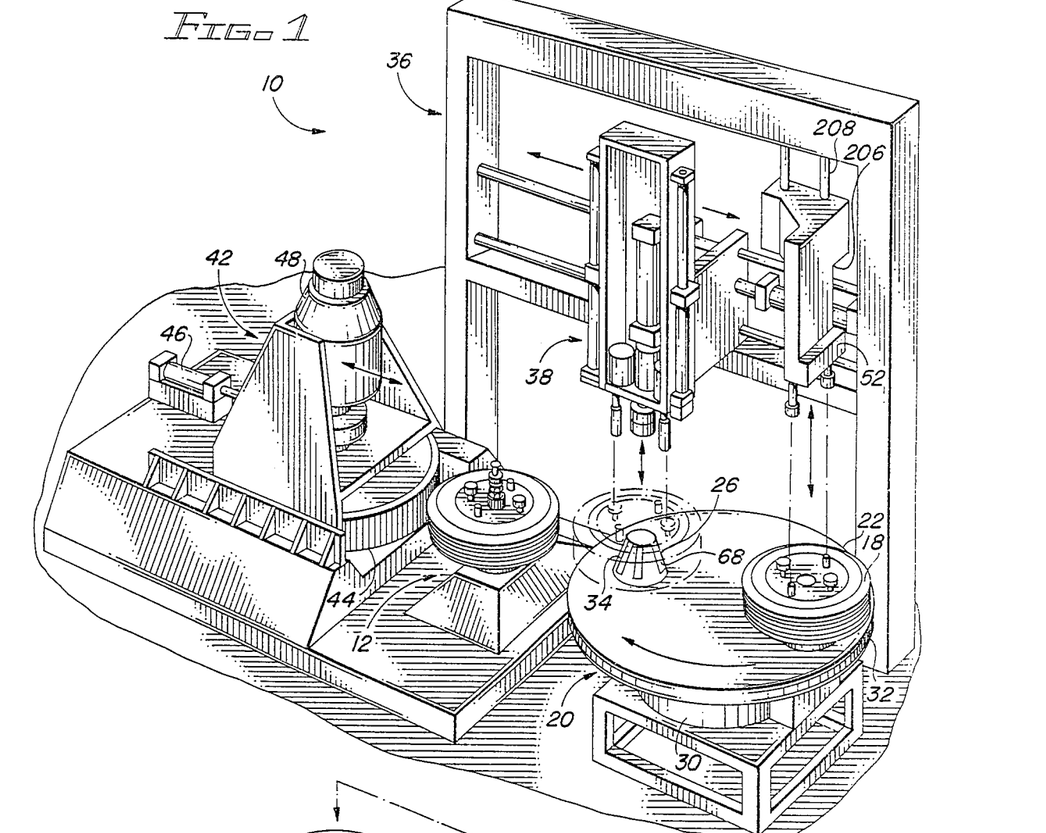
FIG. 1 is a perspective illustration of a tire uniformity machine constructed in accordance with the principles of the present invention.

The tire uniformity machine 10, as particularly seen in FIG. 1, is comprised of a plurality of assemblies which function together in the feeding and testing of tires. The first assembly is the spindle assembly 12 with a test spindle 14 rotatable about its axis and configured to receive a rim assembly 16 supporting a test tire 18. An index assembly 20 includes an index table 22 rotatable about an axis parallel with, but offset from, the axis of the test spindle 14. The index table 22 has a pair of spaced, upwardly extending index spindles 24 and 26. Indexing means 30 are provided to rotate the index table 22 about its axis whereby the index spindles 24 and 26 may move between an operator loading station 32 remote from the test spindle to an index station 34 in proximity to the test spindle 14. A loader robot assembly 36, includes a tire loader and power wrench subassembly 38 adapted to move between a first position at the test spindle 14 and a second position at the index spindle at the index station 34 for moving therebetween a rim assembly 16 supporting a test tire 18. A roadwheel assembly 42 includes a roadwheel 44 rotatable about an axis parallel with, but offset from, the axis of the test spindle 14. The axes of the roadwheel, spindle assembly and index spindle at the index station are parallel with each other but lie in a common plane with the test spindle assembly axis located between the other two axes. Hydraulic cylinder means 46 are provided to move the roadwheel 44 between a retracted position out of contact with a test tire supported by the test spindle and an advanced position wherein the roadwheel is in driving contact with a test tire supported by the test spindle. Motor means 48 rotate the roadwheel while in its advanced position. A transducer 50 is coupled to the test spindle to determine vibrations of the test tire when rotated by the roadwheel as caused by non-uniformities within the test tire. Lastly, an inflator assembly 52 is located above the operator loading station 32 for inflating a test tire with air prior to feeding and testing.

The machine employs a specially designed precision rim assembly 16 for supporting the tire to be tested. Note, in particular FIGS. 5, 6a and 6b. The rim assembly is generally cylindrical in configuration and is formed of a taper sleeve 54 at its radial interior and a rim 56 as its radial exterior. A plurality of similar rim assemblies are preferably utilized in association with each machine. In this mananer, while the machine is testing a tire, an operator may dismount a previously tested tire from its rim assembly and may also mount an additonal tire on an additional rim assembly for testing.

Figure 5:
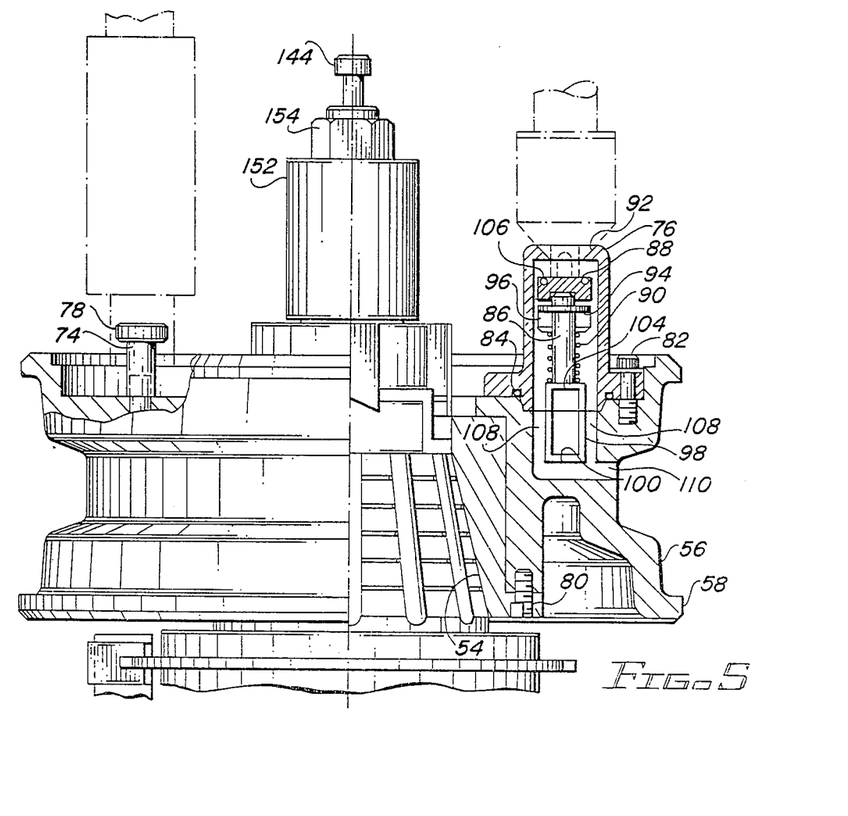
FIG. 5 is a front elevational view of the test spindle assembly with the rim assembly partially in cross section.
Figure 6A:
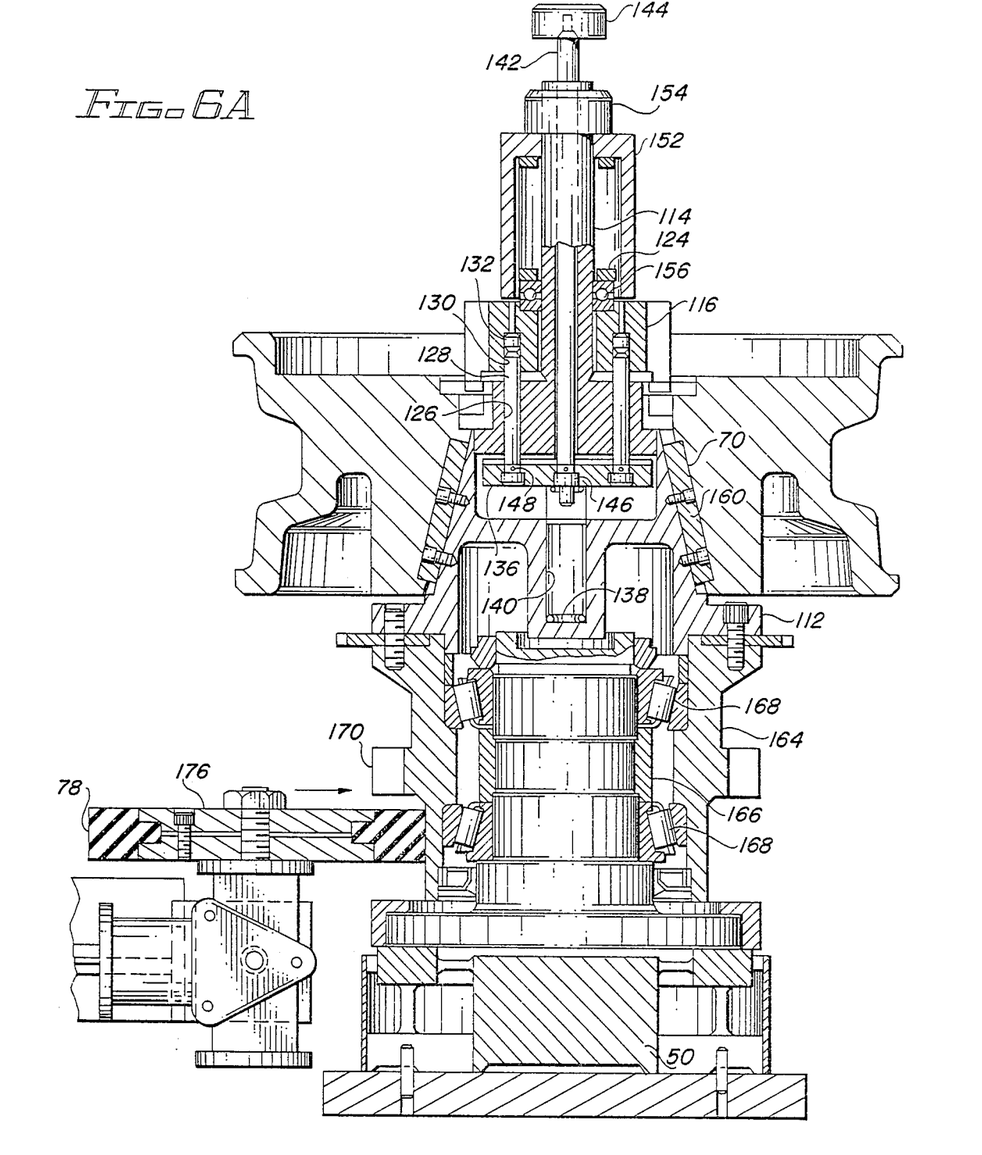
FIG. 6a is a front sectional view of the rim assembly and test spindle assembly.
Figure 6B:
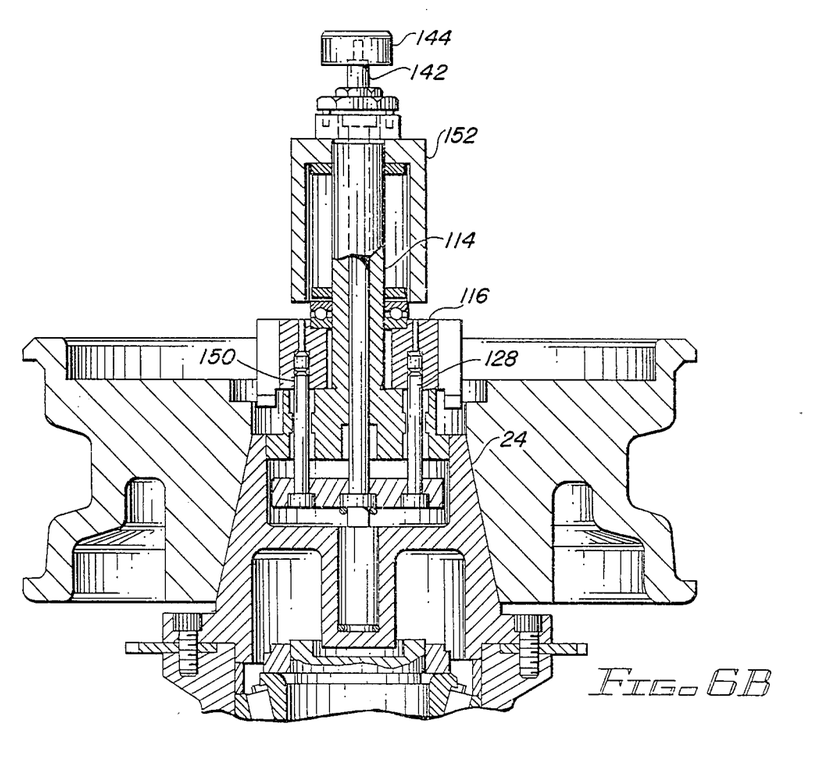
FIG. 6b is a side sectional view of the rim assembly and the upper portion of the test spindle assembly.

The rim 56 is generally cylindrical with a central axis coextensive with the axis of the tire to be tested. Its radially exterior face is formed with flanges 58 configured to simulate the flanges of a vehicle on which the tested tire might be utilized. Its radially interior face is shaped in a cylindrical configuration adapted to receive the taper sleeve 54. The taper sleeve has a radially exterior face of a cylindrical configuration and of a size for receiving the interior face of the rim. The radially interior face of the taper sleeve is of a frustroconical configuration, larger at the bottom than at the top for being received on the test spindle 14. Its upper extent includes locking ramps 60 extending radially inwardly with inclined upper surfaces 62 matable with corresponding components of the machine for holding the rim assembly 16 and test tire 18 in place during the testing operation as will be described more fully hereinafter. Four such concentrically shaped locking ramps are employed in accordance with the preferred embodiment of the present invention. The locking ramps are separated by four concentric spaces 64.

The radially interior face of the taper sleeve 54 includes one or more keyways 66 to receive a drive key or keys 68 located in an index spindle 14 at the index assembly 20 as well as another drive key or keys 70 in the test spindle 14 at the test spindle assembly 12. The keyways and drive keys insure concurrent rotation of the rim and test tire with its supporting spindle and preclude any independent rotation therebetween.

Upwardly projecting from the upper surface of the rim 56 are a pair of gripping pins 74 and a pair of inflation risers 76. The pins and risers are symetrically spaced adjacent the periphery of the rim ninety degrees with respect to each other. Each gripping pin includes an enlarged head 78 at its upper end, elevated from the upper surface of the rim, for functioning in the movement of the rim assembly and test tire between stations and assemblies of the machine as will be described more fully hereinafter. Each gripping pin also includes threads at its lower end for releasably coupling with the rim. The inflation risers 76 are adapted to allow for the flow of air from exterior of the rim, through the inflator assembly 52, through a fluid flow path extending through the rim, and to the tire for effecting its inflation prior to its movement for testing.

The rim assembly 16 is formed to accept upwardly projecting bolts 80 extending through flanges at the lower periphery of the taper sleeve and into the rim for separably coupling the rim and taper sleeve. The bolts allow a common taper sleeve to be used with any one of a plurality of rims of differing sizes as a function of the size of the tire or tires to be tested.

Each inflation riser 76 is in the shape of an inverted cup with apertured flanges at the periphery of its lower end. Bolts 82 extend through the apertures for securing the inflation risers to the rim. O-rings 84, partially recessed within a lower face of the inflation risers, contact an adjacent portion of the rim to pneumatically secure together these elements of the machine.

Located within the inflation riser 76 is a poppet type check valve which permits the passage of a large volume of air to inflate the test tire to the desired pressure. This valve will act to seal air within the tire once the inflator is removed and during the testing process. This valve consists of a poppet or plunger 88 which slides axially along a fixed slide pin 86. A coil spring 90 tends to urge the poppet upwardly toward an air receiving aperture 92 in the upper surface of the inflation riser 76. An O-ring 106, attached to the top surface of the plunger 88, functions to close off the aperture 92 thus creating a pneumatic seal. A roll pin 94 retains the spring 90, plunger 88, and slide pin 86 as an assembly. The plunger 88 has an elongated slot 96 machined through its side to mate with the roll pin 94 and still slide axially up and down along the slide pin 86. The lower end of the slide pin 86 is formed with threads so as it may be screwed down into the threaded sides 98 of a recess 100 in the rim. The lower end of the spring 90 is supported on a shoulder 104 machined on the slide pin 86. The spring 90 extends upwardly therefrom where it contacts and urges the plunger 88 upwardly to seal the aperture 92.

When the air inflator of the inflator assembly 52 is moved into operative contact with the plunger 88 its downwardly extending portion will extend through the aperture to contact and depress the plunger, compressing the spring 90, whereby air may be introduced through the chamber and into the tire. The fluid flow path includes the aperture in the upper face of the inflation riser, the vertical extent of the inflation riser around the plunger and slide pin, parallel vertical holes 108 in the rim and an axial horizontal hole 110 in the rim coupling the vertical holes to the interior of the tire. Removal of the air inflator will allow the spring to return to its original extended position sealing the compressed air in the rim and tire.

Figure 3:
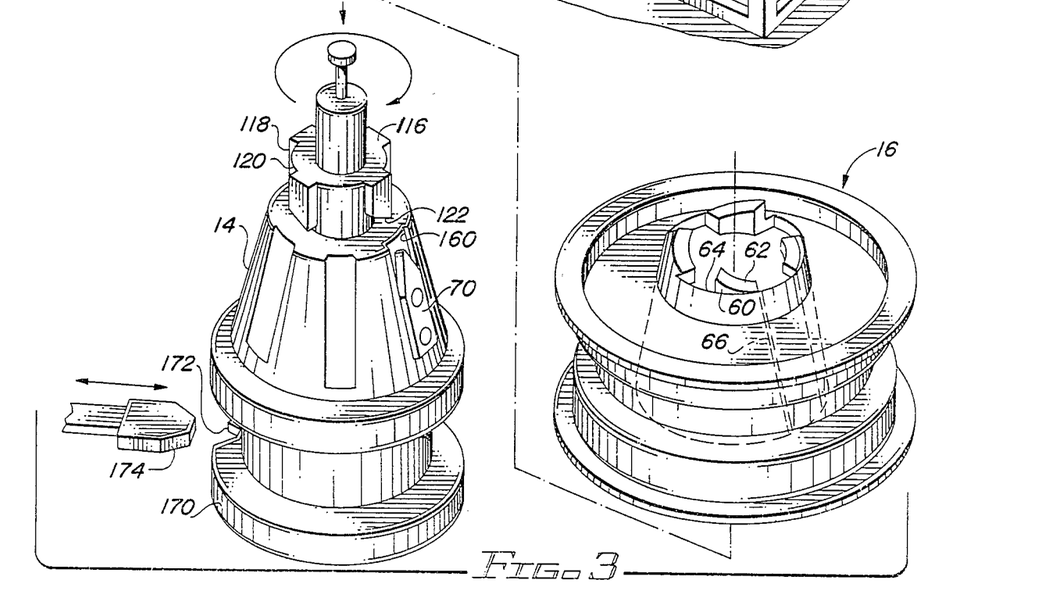
FIG. 3 is an exploded perspective illustration of the test spindle assembly and the rim assembly including the V-locator in its retracted position but excluding the gripping pins and inflation risers to more clearly show the locking ramps.
Figure 4:
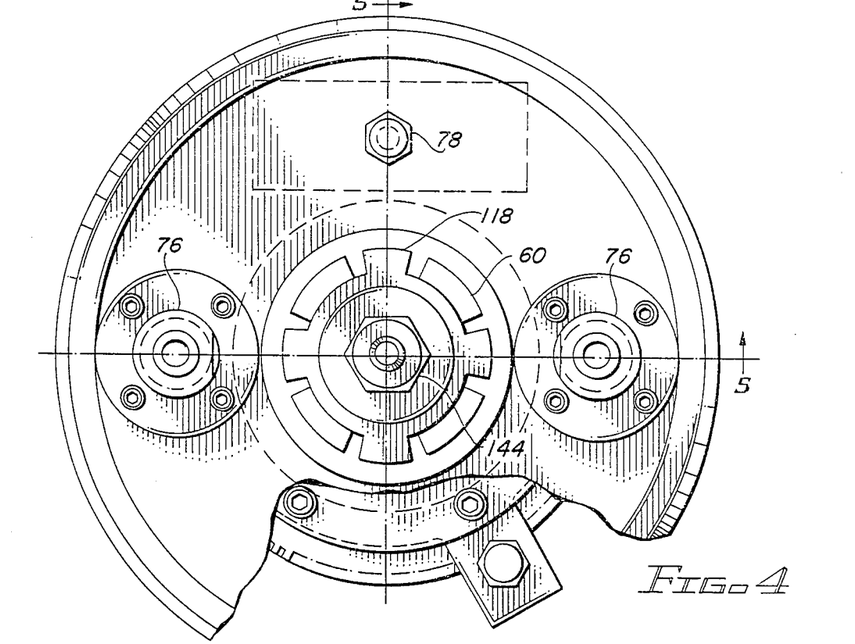
FIG. 4 is a plan view of the test spindle assembly and rim assembly with parts broken away to show certain internal constructions.

As shown particularly in FIGS. 6a and 6b, the main element of the spindle assembly 12 is the rotatable taper body 112 which is configured to receive the test tire through its supporting rim assembly. The exterior peripheral face of the taper body is frustroconical, tapering upwardly to conform with the interior face of the taper sleeve. The upper end of the taper body fixedly supports the enlarged lower end of an elongated chuck body 114 for rotation therewith. At its axially central extent, the chuck body rotationally supports a locking rotor 116 having radially outwardly directed locking ramps 118 formed with circumferential spaces 120 therebetween. The lower surfaces of the locking ramps are formed with inclined surfaces 122 which contact, and cooperate with, the inclined surfaces 62 of the locking ramps 60 of the rim assembly 16 to effect a coupling action. Note FIG. 3. The inclined ramps and spaces of both the spindle assembly and rim assembly are configured to cooperate whereby clockwise rotation of the rotor as seen in FIG. 3 in association with downward pressure on the rotor by the die spring 124 will lock the lower surfaces of its ramps over the upper surfaces of the inclined ramps of the rim to effect the locking of the rim assembly and tire to the spindle assembly.

Apertures 126 extend through a flange at the lower end of the chuck body 114 for receiving a pair of lock pins 128. The upper ends of the lock pins extend into aligned, upwardly extending recesses 130 in the rotor. Plugs 132 are preferably located within the recesses of the rotor for purposes of proper spacing. When the lock pins are extended into the recesses of the rotor, they will preclude rotation of the rotor with respect to the chuck body 114, taper body 112, and the remainder of the spindle assembly.

The lower ends of the lock pins are formed with enlargements which are received in recesses of a T-bar 136 upwardly biased by a coil spring 138. Positioning of the spring is effected by placement of its lower end in an axial recess 140 of the taper body 112. Axial movement of the T-bar and lock pins downwardly is effected by the application and removal of an external force upon a plunger 142.

The plunger is an axially located, elongated, cylindrical member positioned with a button 144 at its upper end for receiving an external force and with a collar 146 adjacent to its lower end within a central recess of the T-bar. Pins 148 couple the lower ends of the lock pins and plunger to the T-bar. Thus, a downward force on the button and plunger will move the T-bar downwardly to compress the coil spring 138 while driving the lock pins downwardly out of locking engagement with the rotor. Relief of the external pressure on the button allows for the coil spring to drive the T-bar, pins and plunger upwardly, either to position the upper ends of the pins within the recesses of the rotor, or into alternate recesses 150 in the lower surface of the rotor if the rotor has been rotated.

An inverted cup-shaped cover 152 is positioned with its central aperture located to receive an upper extent of the chuck body. Its upward movement is limited by a nut 154 threadingly received on the upper end of the chuck body. Its downward movement is limited by a die spring 124, the upper end of which bears against the cover and the lower end of which bears against the rotor through a thrust bearing assembly 156. The die spring 124 also functions to urge the rotor and its locking ramps into contact with the locking ramps of the rim after the lock pins have been retracted and the rotor has been rotated into its locking orientation. This unlocking motion of the rotor with respect to the taper body will allow rotation therebetween to both axilly and rotationally engage the matable locking ramps.

Figure 6C:
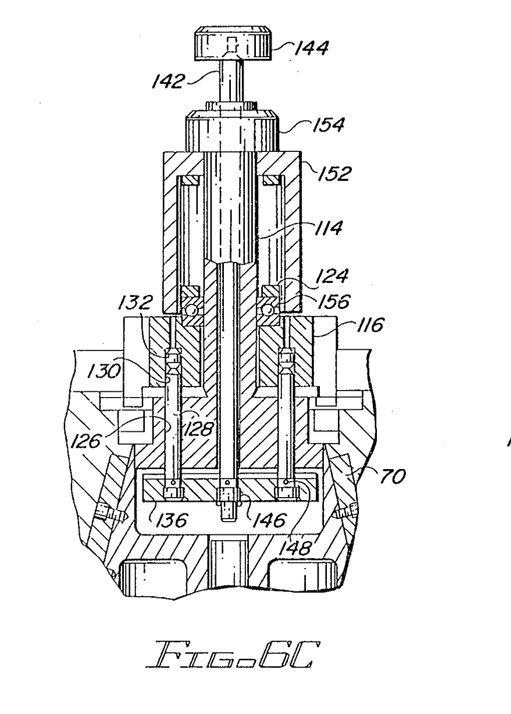
FIGS. 6C, 6D and 6E are side sectional views of the rim assembly and the upper portion of the test spindle assemblies showing the movements sequentially thereof between various positions.
Figure 6D:
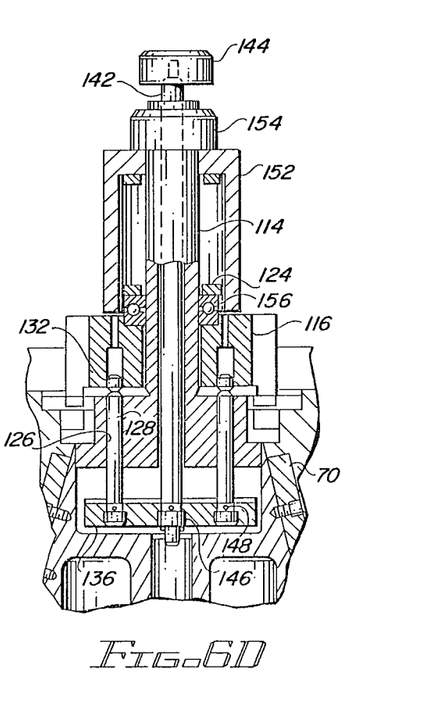
Figure 6E:
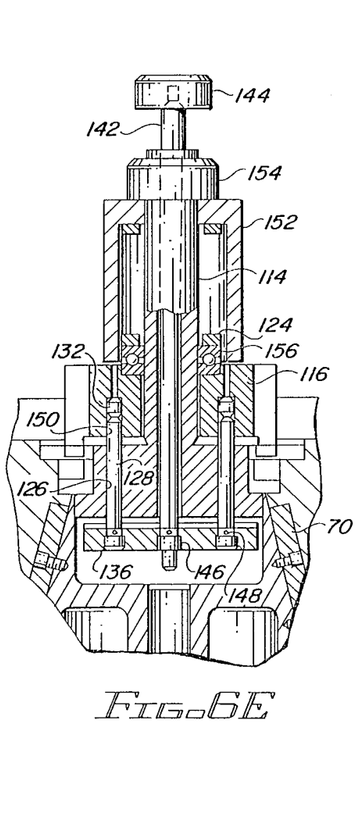
Figure 7:
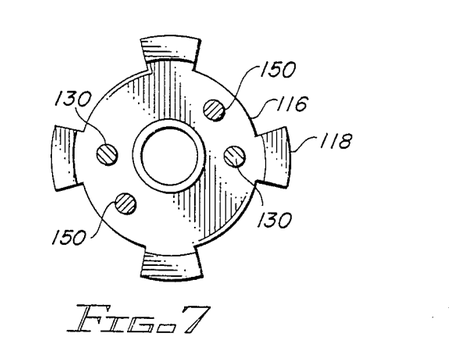
FIG. 7 is a plan view of the locking rotor.
Figure 8:
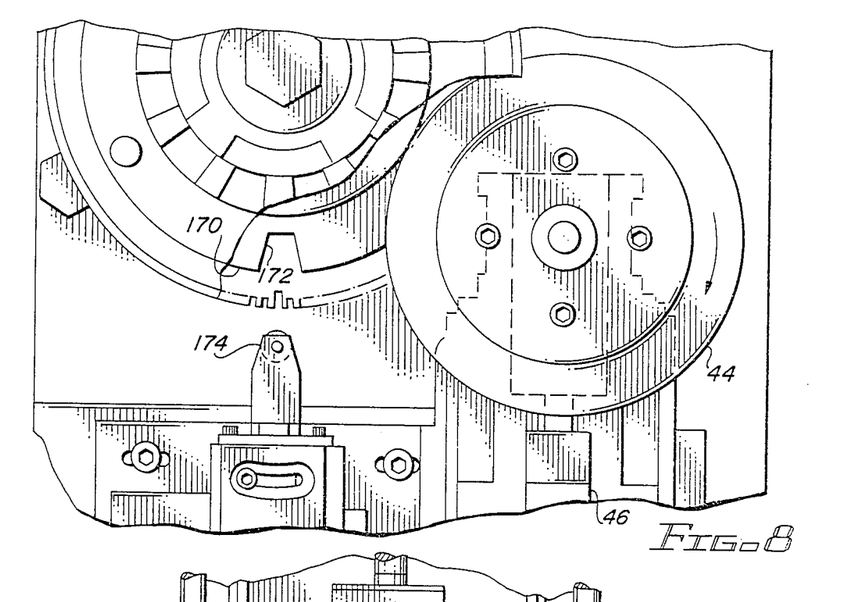
FIG. 8 is a plan view of the V-locator, test spindle assembly and roadwheel.

FIG. 6C is similar to FIG. 6B but illustrates the locking pins 128 advanced into recesses 130 to preclude rotation of rotor 116 with respect to the spindle assembly 12. FIG. 6D shows the button 144 depressed and locking pins 128 retracted to allow rotation of the rotor 116 with respect to the spindle assembly 12 and rim assembly 16. Lastly, FIG. 6E is a showing similar to FIG. 6D but with the rotor 116 rotated and the locking pins 128 advanced into alternate recesses 150 in rotor 116 whereby the ramp surfaces 62 are in locking orientation beneath inclined surfaces 122 for frictionally coupling the rim assembly 16 with respect to the spindle assembly 12 under the resilient force of die spring 124.

The upwardly tapering exterior face of the taper body 112 includes keyways 160, at least one of which is provided with a drive key 70 extending radially outwardly of the surface of the keyway to allow coupling with an aligned keyway 66 in the rim assembly to thereby preclude rotation of the rim with respect to the spindle during operation and use. The spindle assembly 12 also includes a spindle hub 164 bolted to the lower surface of the taper body for rotation therewith. The spindle hub has located internal thereof a tube spacer 166 with roller bearings 168 to allow for the rotation of the spindle hub and taper body with respect to the fixed tube spacer. The spindle hub includes a flange 170 having an axially extending V-shaped notch 172 adapted to receive a spindle lock or V-locator 174 for effecting the proper predetermined rotational positioning of the spindle, its locking ramps, as well as the rim and tire.

A drive wheel 176 with an elastomeric surface 178 is located in driving contact with the lower portion of the spindle hub to effect any necessary minor rotation of the spindle hub and consequently the tire until the spindle lock or V-locator 174 is received within the notch 172 and effects proper rotational positioning of the spindle assembly. The tube spacer 166 slips onto a fixed shaft and is fit to obtain a proper preload for the tapered roller bearings 168. The entire spindle assembly mounts on top of the transducer 50 for detecting the vibrations caused by structural nonuniformities within the test tire during rotation.

Figure 2A:
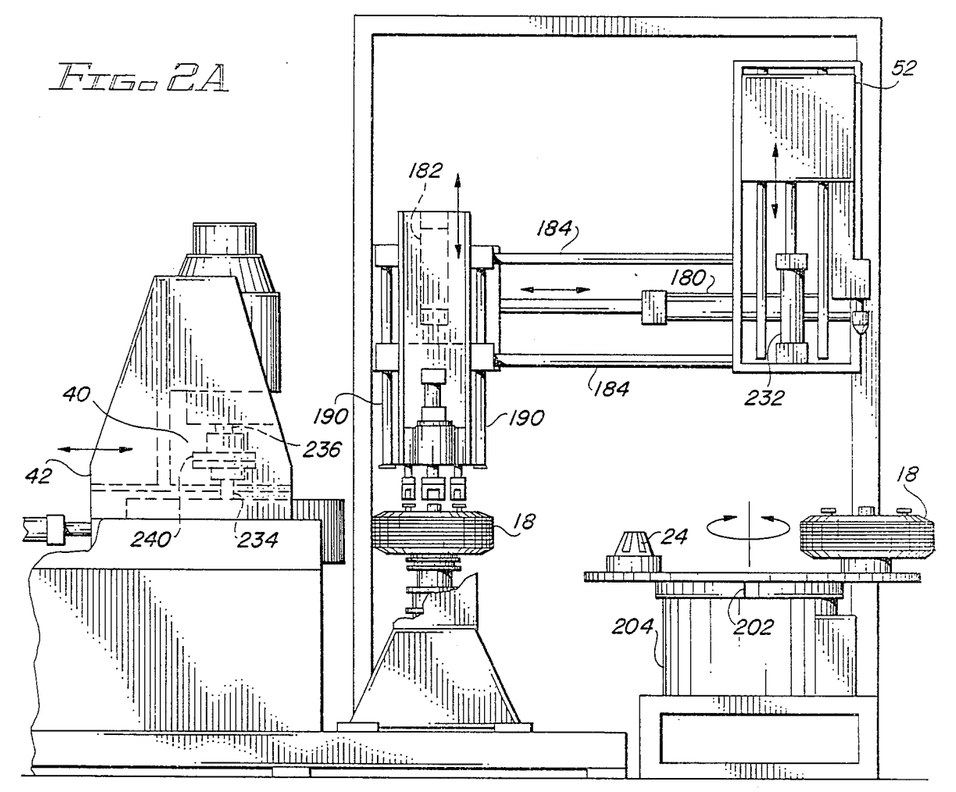
FIG. 2a is a front elevational view of the tire uniformity machine shown in FIG. 1.

The loader robot assembly 36 serves two functions. It moves the tire back and forth between the index assembly 20 and the test spindle assembly 12. It also functions to provide the forces needed to couple and uncouple the rim assembly 16 with the spindle assembly 12. These forces are provided by mechanisms located in a tire loader and power wrench subassembly 38 mounted for vertical reciprocation between a lower orientation for gripping and releasing a rim assembly 16 supporting a tire and an upper orientation for horizontal movement. This subassembly is also mounted for horizontal reciprocation between a first position above the index spindle at the index station 34 and a second position above the test spindle assembly 12. As seen in FIGS. 1 and 2a, horizontal pneumatic cylinder 180 effects the motion of the subassembly from between the spindles while a vertical pneumatic cylinder 182 raises and lowers the tire loader and power wrench subassembly between a lower operational position and a raised moving position for movement between assemblies.

The loader robot assembly includes an array of vertical and horizontal supports extending from adjacent to the test spindle and the index spindle at the indexing station. Horizontal guide rails 184 are supported for the movement of the tire loader and power wrench subassembly. This subassembly is provided with rollers for its smooth horizontal movement and is also coupled with a horizontal pneumatic cylinder 180 for movement of the subassembly between its end positions. Limit switches, conventional in their design and use, are also provided adjacent the end positions to inactivate the horizontal pneumatic cylinder when the end positions are reached by the subassembly. The tire loader and power wrench subassembly includes the power wrench 186, the gripper fingers 188 and their activating solenoids, rollers to guide its motion on vertical guide rails 190, and limit switches, also conventional, to inactivate a vertical pneumatic cylinder 182 when the subassembly reaches its intended raised or lowered position.

The gripper fingers 188 include a pair of mating blocks 192 and 194 movable between opened exterior positions and closed interior positions equidistant from the centerline of the gripper pins. In their closed interior positions, recesses 196 within the gripper finger blocks receive and support the enlarged heads 78 of the gripper pins 74 to effect support of the gripper pins, rim and tire for movement between the test spindle and the index spindle at the indexing station. In their exterior positions the gripper finger blocks may be raised and lowered independent of the gripper pins whereby the test tire may rotate independently of the gripper fingers. Appropriate and conventional solenoids, not shown, may be provided within the gripper blocks to allow for the gripping and releasing of a rim by the gripper pins.

Moving upwardly and downwardly with the gripper blocks is the power wrench 186. In addition to the movement in a vertical plane, the power wrench is also provided with a rotary actuator 198 to provide a rotational motion to the power wrench about its axis. This axis is also the axis of the rim and tire as well as the test spindle. The rotary actuator effects the rotation of the power wrench when in its lower position when its fingers are located within the spaces 120 between the locking ramps 118 of the locking rotor 116. The vertical edges of the wrench will contact the vertical edges of the locking ramps of the locking rotor in the spaces therebetween. Actuation of the rotary actuator 198 and power wrench 186 in a clockwise direction for forty-five degrees will cause a wedging action of the locking ramps 118 of the locking rotor into sliding contact with the mating surfaces 62 of locking ramps 60 of the rim assembly 16 to couple their surfaces in a secure frictional contact through the axial force imparted by the die spring 124. After the locking has been completed, the gripper fingers 188 will be energized to release the gripping pins 74 and to rise to a position out of contact with the rim and spindle so that the test tire may be rotated for the testing procedure. In addition, the central portion of the power wrench 186, due to its downward movement, contacts the button 144 of the plunger to provide an axial motion sufficient to disengage the lock pins 128 from the recesses 130 of the rotor whereby desired rotation of the rotor may then be effected.

When the testing procedure is complete, the subassembly will again be lowered whereby the gripper fingers 188 grasp the gripping pins 74. The locking pins 128 will also be retracted from the additional recesses to allow for the counter-rotation of the locking rotor 116. The power wrench 186 will also contact the locking ramps 118 of the rotor 116 to allow rotation of the locking rotor counterclockwise, a forty-five degree counterclockwise movement, concurrently with the gripping of the gripping pins 74 and the lifting of the rim and tire from the test spindle. Elevation of the subassembly after the counterrotation returns the lock pins 128 from the alternate recesses 150 to the primary recesses 130 in the locking rotor 116. Horizontal motion of the subassembly to a location above the index spindle and the lowering of the subassembly are then followed by the release of the gripping pins 74. The test spindle is again ready for indexing of the tested tire to the operator loading station 32 and the receipt of a subsequent tire to be tested.

The index assembly 20 includes a flat circular table 22 adapted for rotary oscillation of one hundred eighty degrees between an operator loading station 32 and an index station 34. The table is mounted with its axis located on the axis of a supporting shaft 202, the lower end of which is coupled to a indexing motor 30 located within a housing 204. The housing is provided with indexing switches for oscillating the circular table and two upstanding index spindles 24 and 26 one hundred eighty degrees in either direction for moving a test tire between the operator loading station 32 adjacent the operator and the index station 34 beneath the loader robot assembly for movement of the tire and rim assembly to the test spindle by the loader robot assembly and for then receiving the tested tire from the test spindle by the loader robot assembly. The index spindles with the tested tire may then be rotated back one hundred eighty degrees to the operator loading station where the tested tire may be removed by an operator for disassembling the tire from the rim and whereat the next tire to be tested, along with its supporting rim assembly, may be placed on the index spindle at the loading station.

Located above the index spindle at the operator loading station is the automatic tire inflator assembly 52. Note FIGS. 1 and 9. The tire inflator assembly is mounted on a head bracket 206 for vertical reciprocation on guide rails 208 toward and away from the spindle and tire to be inflated at the operator loading station. The tire inflator assembly includes two similarly configured inflating members mounted through cylinders 210 to the head bracket 206 for concurrent vertical reciprocation therewith.

Figure 9:
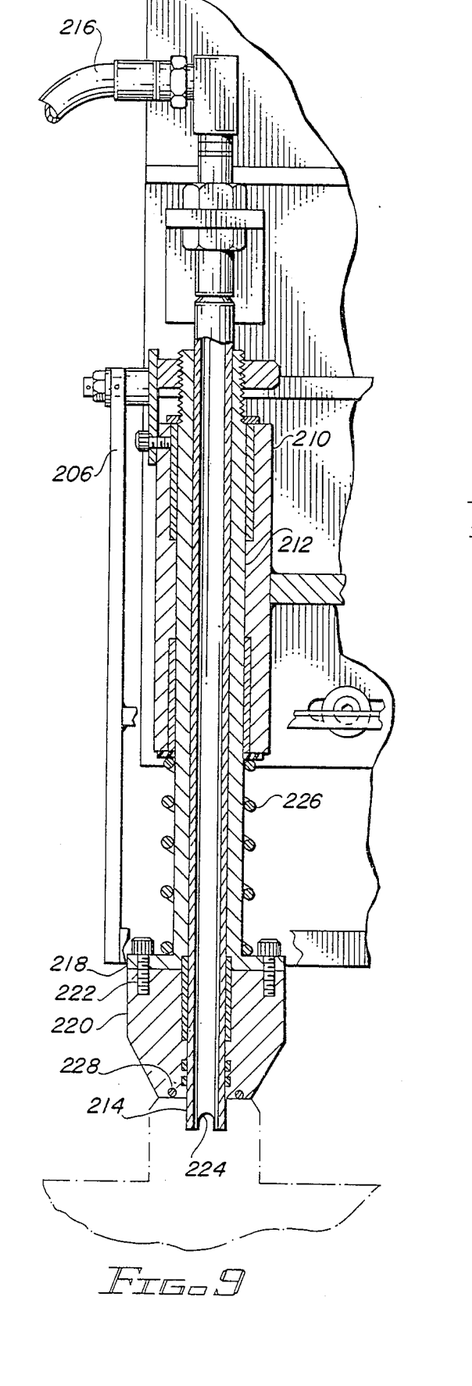
FIG. 9 is a sectional view of a portion of the inflator assembly.
Figure 10:
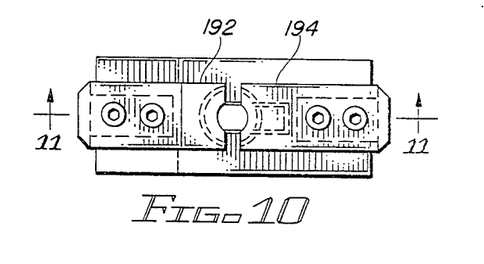
FIG. 10 is a plan view of the gripper fingers.
Figure 11:
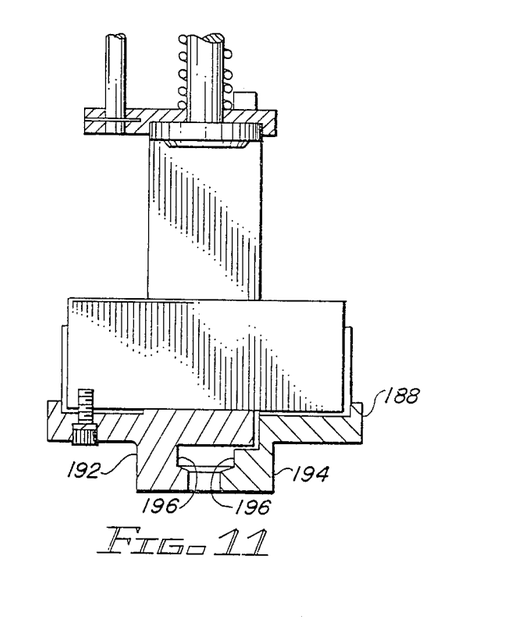
FIG. 11 is a sectional view of the gripper fingers taken along line 11—11 of FIG. 10.
Figure 12:
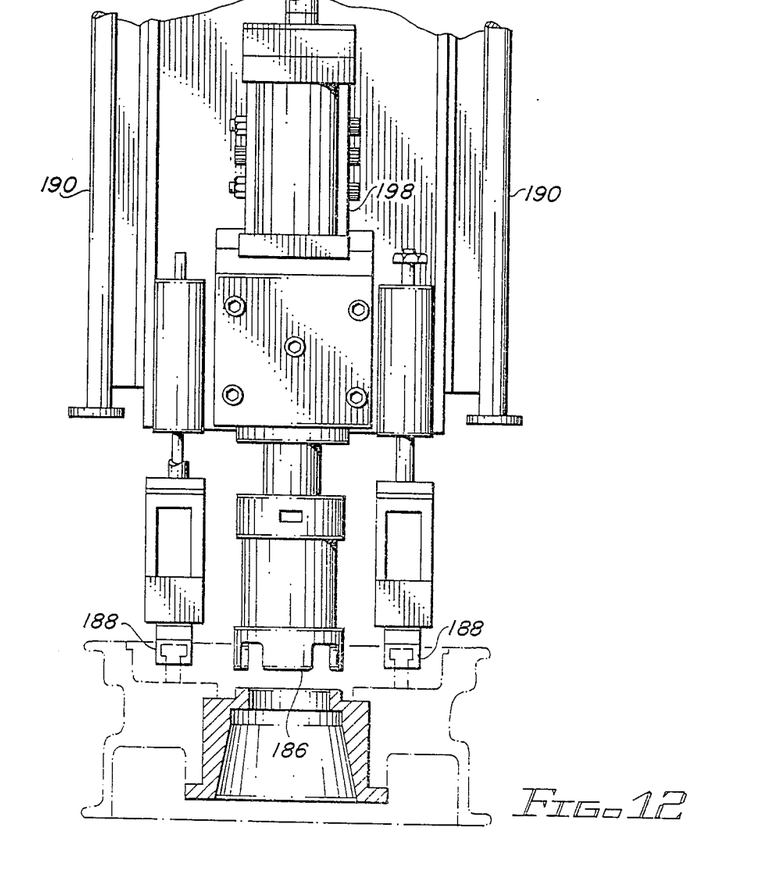
FIG. 12 is a side elevational view of the tire loader and power wrench subassembly and locking rotor with the rim shown in a phantom illustration.

Within the central bore of each cylinder is a shaft 212 having a central bore for receiving an air tube 214. Each air tube is coupled through flexible tubes 216 at its upper end with a source, not shown, of air or other appropriate aeroform fluid under pressure. The lower end of each shaft 212 is provided with a flange 218 to support an inflator head 220 through bolts 222. The lower end of each shaft is provided with semicircular cutouts 224 by which compressed air may flow from the source, through the air tube by way of the inflation risers and channels into the tire to be tested. A coil spring 226 is located between the upper surface of the flange and the lower edge of the cylinder 210 whereby downward motion of the tire inflator into contact with the inflation riser may cause the air tube to rise with respect to the cylinder and head bracket when the downward motion of the head bracket causes the air tube to make a tight fit with the inflation riser. O-rings 228 recessed within the lower face of the inflator head effect a secure pneumatic coupling of the tire inflator with the inflation riser. Upward motion of the head bracket following inflation will allow for the expansion of the coil spring and return of the inflation head and flanged shaft in anticipation of the next inflation cycle. The vertical movement of the inflator assembly is effected by a vertical pneumatic cylinder 232 with conventional limit switches to deenergize the pneumatic cylinder when the air tubes arrive at their proper raised or lowered positions.

With reference to FIGS. 1, 2b, 2d, 2e and 8, the main component element of the roadwheel assembly 42 is the roadwheel 44 with its exterior cylindrical surface rigidly formed of a precision aluminum mounted on radially extending support struts. The roadwheel has a spindle 234 at the interior ends of its struts. The spindle is fixedly mounted on a shaft rotatable about a vertical axis parallel with and offset from the axis of the test spindle and test tire. Bearing assemblies are mounted at opposite ends of the spindle proximate the ends of the hub. The spindle is coupled to the drive shaft 236 of a DC motor 48 mounted coaxially with the spindle. An elastomeric coupling 240 secures the drive shaft of the motor with the roadwheel for the smooth application and relief of power.

Figure 2B:
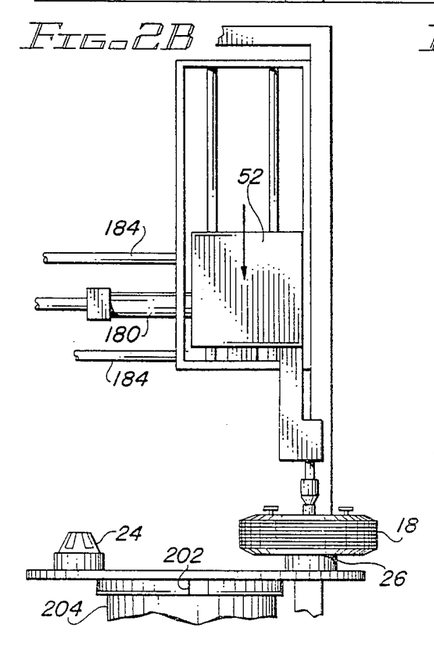
FIG. 2b is a partial front elevational view of the machine shown in FIG. 2a but with the inflator assembly in its lowered position.
Figure 2C:
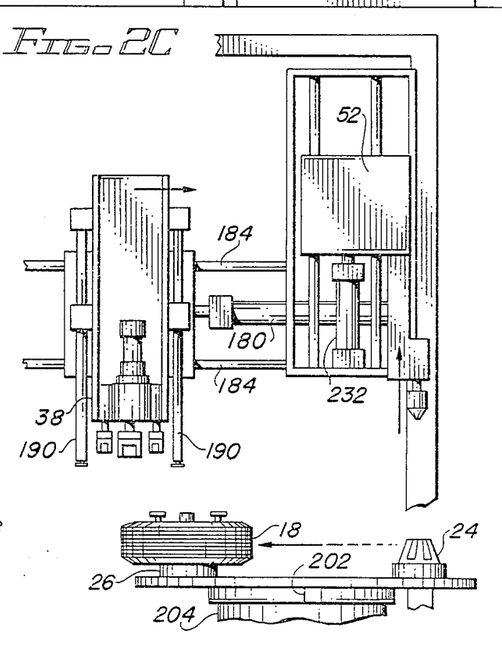
FIG. 2c is a partial front elevational view similar to that shown in FIG. 2b but with the inflator assembly raised and the tire loader and power wrench subassembly preparing for being lowered.
Figure 2D:
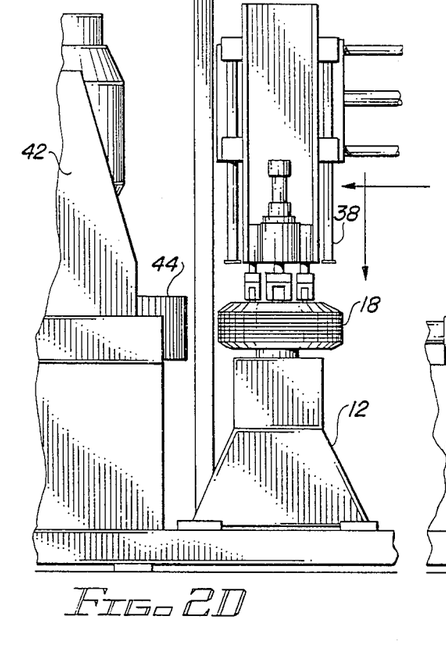
FIG. 2d is a partial front elevational view of the tire loader and power wrench subassembly shown in FIG. 2a but having lowered a tire with its supporting rim onto the test spindle assembly.
Figure 2E:
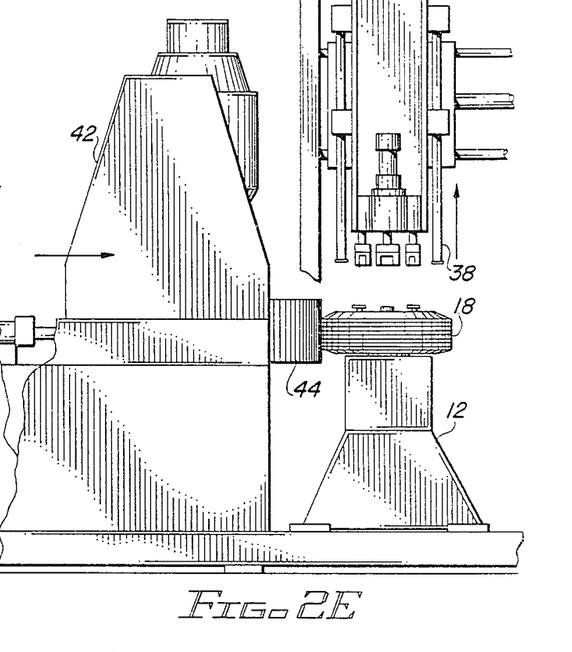
FIG. 2e is a partial front elevational view similar to that shown in FIG. 2d but with the tire loader and power wrench subassembly raised and the roadwheel in its advanced position.

The roadwheel and motor are mounted in a carriage 242 mounted on guide rails through appropriate bearing assemblies. Stop plates and limit switches are located at opposite ends of one of the guide rails to limit the path of movement of the carriage, motor and roadwheel between a retracted position with the roadwheel out of contact with the test tire, as shown in FIGS. 2a and 2b, and an operative advance position wherein the roadwheel will drivingly contact the test tire on the test spindle. Note FIGS. 1 and 2e. A hydraulic cylinder 46 is coupled to the carriage 242 for retracting and advancing the roadwheel. The hydraulic cylinder is inactivated by conventional limit switches which determine the carriage arriving at the proper retracted and advanced positions.

In operation and use, the tire uniformity machine of the present invention may function to carry out a method of handling test tires and testing them for uniformity in an essentially automatic mode of operation. The sequence of events may be followed by referring to FIGS. 2a through 2e. The operator begins by mounting a tire 18 on a rim 56 and placing the uninflated tire with its supporting rim on the index spindle 26 at the operator loading station 32 of the index table assembly 20. The location of the key or keys 68 of the index spindle and the keyway or keyways 66 of the rim insure proper orientation of the gripper pins 74, inflation risers 76, and locking ramps 60 and 118 as required throughout the sequencing of the machine and its method. If desired, the spindles at the index assembly 20 may be provided with locking mechanisms, including locking ramps, a locking rotor and the like, of the type employed at the test spindle assembly 12, in order to provide for more accurate handling of the test tire.

The depression of a conventional start pedal, not shown, associated with an operator console will initiate the automatic operation of the machine with timing of the various solenoids and pneumatic cylinders controlled by limit switches energized and de-energized by the functioning components of the machine. With the start pedal engaged, the pneumatic cylinder 232 will drive down the inflator assembly 52 and position the air tubes 214 in operative engagement with the inflation risers 76 of the rim 56 allowing the flow of air through the rim into the tire. When the appropriate pressure has been provided, the inflator assembly will rise with the plunger of the inflation risers acting as a valve to seal the rim and tire with air of a predetermined pressure. The pneumatic cylinder will stop its upward or downward motions upon contacting associated limit switches with which it is coupled.

Upon the inflator assembly reaching its uppermost position, a limit switch will stop its upward motion and signal the index table to rotate 180 degrees thereby tripping a limit switch which will energize the automatic tire loader and power wrench subassembly 38 whereby a vertical pneumatic cylinder 182 of the subassembly will drive the subassembly downward toward a test tire previously fed to the index station. Upon reaching its appropriate lowermost position, the downward motion of the subassembly will stop with its limit switch having been contacted. This action will close the gripper fingers 188 to grasp the gripper pins 74 through solenoids in the blocks of the gripper fingers. The gripper fingers having been closed, the vertical pneumatic cylinder 182 will raise the subassembly until it contacts a limit switch to stop the upward movement. At this point, the subassembly will move horizontally through the energization of the horizontal pneumatic cylinder 180 until a limit switch is contacted. The subassembly and rim with its supporting tire is thus positioned above the test spindle assembly 12. At this point, the vertical pneumatic cylinder 182 is energized to lower the subassembly and position the rim and supported test tire on the test spindle. Upon reaching the lower position, a limit switch is contacted by the subassembly to rotate the rotary actuator 198 for a forty-five degree clockwise rotation since the subassembly has lowered the locking pins 128 to allow rotation of the locking rotor 116. At this time, the limit switch associated with the rotary actuator will be contacted to open the gripper fingers and also retract the V-locator 174 whose limit switches will energize the vertical cylinder 182 to raise the subassembly 38 allowing the locking pins 128 to enter the alternate recesses for locking the tire and rim with the locking rotor and the locking rotor with the lower mechanisms of the test spindle assembly. At this time, hydraulic cylinder 46 will move the roadwheel 44 through its carriage into driving contact with the test tire.

The test sequence on the test tire will then be carried out with the roadwheel 44 rotating in contact with the test tire 18 and the transducer 50 sensing the vibrations of the test spindle. During the testing sequence, the roadwheel is rotated at varying speeds and loads representative of those which occur on automobiles in service and measure the vibratory axle forces which cause vibrations and acoustical disturbances in the automobiles.

With the test sequence having been completed, the test spindle will be rotated automatically until the V-locator 174 moves into its slot 172 on the taper block and the test spindle is properly located. The automatic tire loader and power wrench subassembly 38 of the loader robot assembly 36 will then be lowered automatically and its gripper fingers 188 closed over the gripper pins 74 as well as the locking pins 128 retracted from the alternate recesses 150 of the locking rotor 116. The above-described sequence will then be automatically operated in reverse until the tested tire arrives at the operator loading station for being manually removed from the index spindle and the tire deflated and disassembled from its rim.

While the machine is functioning to test a tire, the operator may mount an additional tire on an additional rim and place it on the index spindle at the operator loading station. In this manner, when the tested tire is rotated from the indexing station to the operator loading station, the next tire to be tested will be moved to the index station for the next test sequence.

The present disclosure includes that information contained in the appended claims as well as that in the foregoing description. Although the invention has been described in its preferred forms or embodiments with a certain degree of particularity, it is understood that the present disclosure of the preferred form has been made only by way of example and that numerous changes in the details of construction, fabrication and use, including the combination and arrangement of parts and method steps, may be resorted to without departing from the spirit and scope of the invention.

What is claimed is:

1. In combination, a rim asembly and a spindle assembly including means for releasably coupling said rim assembly and said spindle assembly for concurrent rotation:

said rim assembly having an exterior peripheral flange adapted to support a tire thereon, said rim assembly also having an interior axial opening for receiving said spindle assembly to which it is to be coupled, said rim assembly also having a plurality of locking ramps extending radially inwardly into said opening, said locking ramps having inclined surfaces on one face thereof;

said spindle assembly having a taper body with an exterior face of a size and shape to be received within said opening of said rim assembly, said spindle assembly also having a locking rotor coupled to said taper body, said locking rotor having locking ramps extending radially outwardly therefrom, said locking ramps having inclined surfaces on one face thereof couplable with said inclined surfaces of said rim assembly upon the rotation of said locking rotor; and locking means to lock said locking rotor in a first angular orientation with respect to said taper body when said inclined surfaces of said locking rotor are out of contact with said inclined surfaces of said rim assembly and to lock said locking rotor in a second angular orientation with respect to said taper body when said inclined surfaces of said locking rotor are in contact with said inclined surfaces of said rim assembly.

2. The combination as set forth in claim 1 wherein said locking means include pin means extending through a portion of said taper body and into said locking rotor to preclude rotational motion therebetween.

3. The combination as set forth in claim 2 and further including means to retract said pin means from said locking rotor whereby said locking rotor may rotate with respect to said taper body from the first angular orientation to the second angular orientation for coupling said rim assembly to said spindle assembly.

4. The combination as set forth in claim 3 and further including spring means urging together said inclined surfaces of said rim assembly and said inclined surfaces of said spindle assembly.

5. The combination as set forth in claim 3 wherein said means to retract said pin means extends to exterior of said taper body and said locking rotor.

6. The combination as set forth in claim 1 wherein said inclined surfaces of said spindle assembly face downwardly and are located above said inclined surfaces of said rim assembly which face upwardly and wherein spaces are provided between said locking ramps of both said spindle assembly and said locking ramps of said rim assembly for the passage of said locking ramps of said rim assembly to beneath said locking ramps of said spindle assembly.

7. The combination as set forth in claim 6 wherein the vertical edges of said locking ramps of said spindle assembly between its locking ramps are adapted to receive forces from an external mechanism to rotate said locking rotor between its locked and unlocked positions.

8. The combination as set forth in claim 7 wherein said means to retract said pin means extends above said locking rotor whereby the external mechanism may be located to concurrently retract said pin means and rotate said locking rotor.

* * * * *